(12) United States Patent
Lucas et al.

(10) Patent No.: US 10,766,693 B2
(45) Date of Patent: Sep. 8, 2020

(54) RECEIVER ACTUATION SYSTEM FOR OPENING A GATE ON A PORTABLE BULK MATERIAL CONTAINER

(71) Applicant: Halliburton Energy Services, Inc., Houston, TX (US)

(72) Inventors: Bryan Chapman Lucas, Duncan, OK (US); Wesley John Warren, Marlow, OH (US); Chad Adam Fisher, Cache, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 185 days.

(21) Appl. No.: 15/862,235

(22) Filed: Jan. 4, 2018

(65) Prior Publication Data
US 2019/0202632 A1 Jul. 4, 2019

(51) Int. Cl.
*B65D 90/58* (2006.01)

(52) U.S. Cl.
CPC .................. *B65D 90/587* (2013.01)

(58) Field of Classification Search
CPC ........ B65D 47/12; B65D 90/54; B65D 90/58; B65D 90/587; B65D 90/66; B65G 65/40
USPC ........................................... 414/414
See application file for complete search history.

(56) References Cited

U.S. PATENT DOCUMENTS

| 2,398,887 | A | * | 4/1946 | Drinnon | G01G 13/00 |
|---|---|---|---|---|---|
| | | | | | 177/72 |
| 4,018,473 | A | * | 4/1977 | Chalupsky | B62D 33/063 |
| | | | | | 296/190.04 |
| 4,829,917 | A | * | 5/1989 | Morgante | D05C 15/30 |
| | | | | | 112/80.41 |
| 4,925,356 | A | * | 5/1990 | Snead | E01B 27/02 |
| | | | | | 414/339 |
| 7,252,309 | B2 | | 8/2007 | Soon et al. | |
| 8,585,341 | B1 | | 11/2013 | Oren et al. | |
| 2014/0305769 | A1 | | 10/2014 | Eiden, III et al. | |
| 2015/0086307 | A1 | | 3/2015 | Stefan | |
| 2015/0360856 | A1 | * | 12/2015 | Oren | B65G 65/42 |
| | | | | | 414/411 |
| 2017/0190524 | A1 | * | 7/2017 | Oren | B65G 15/00 |

* cited by examiner

*Primary Examiner* — Glenn F Myers
(74) *Attorney, Agent, or Firm* — John Wustenberg; Parker Justiss, P.C.

(57) ABSTRACT

This disclosure provides a discharge actuation apparatus that is configured to not only fully open and close a sliding gate of a bulk material container, but also move the gate pin to a neutral position with respect to a keeper slot of the bulk container and a receiver slot of the discharge actuation apparatus to ensure proper alignment of the receiver slot and the keeper slot with the gate pin of the bulk container to reduce the likelihood of damage to the receiver or the bulk container during the container's replacement on to the receiver.

20 Claims, 13 Drawing Sheets

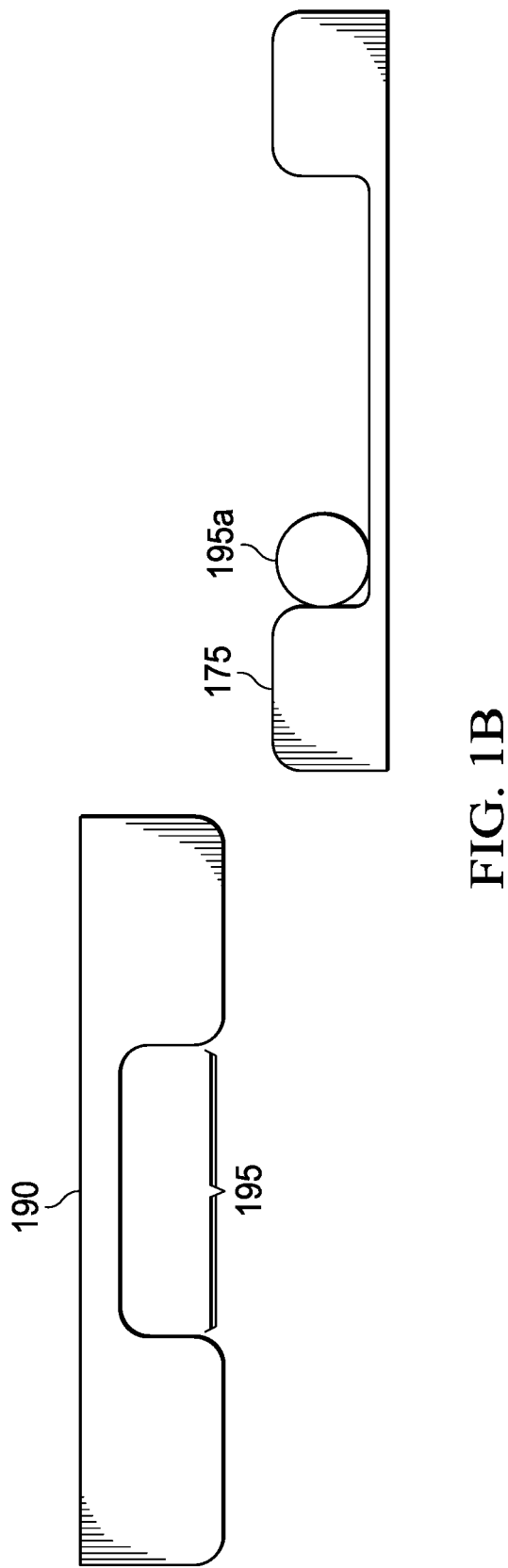

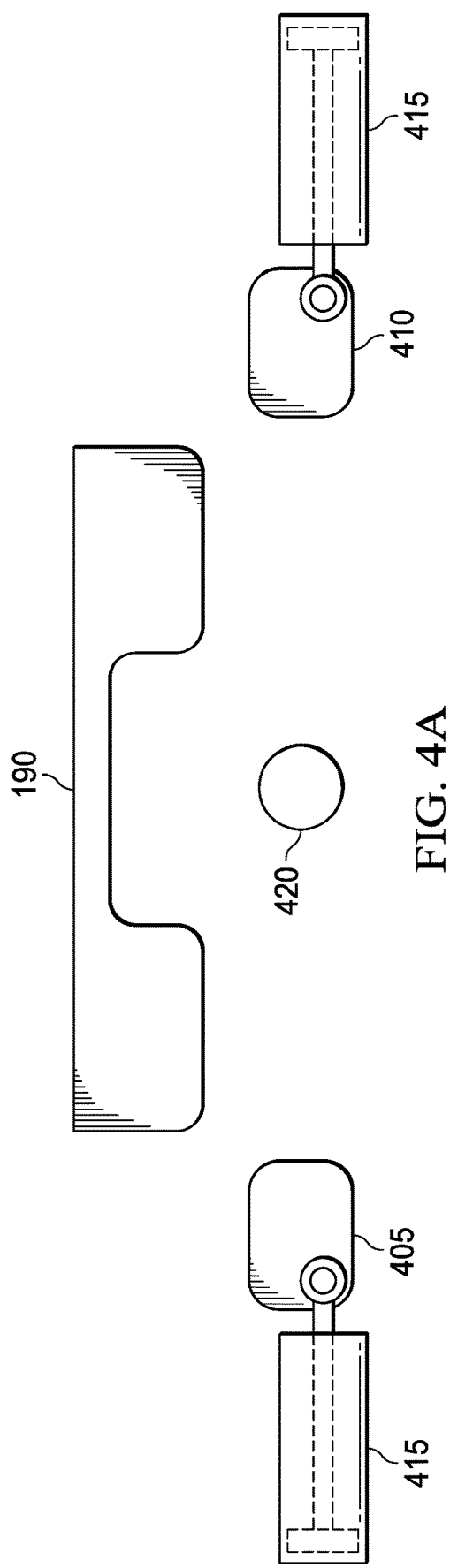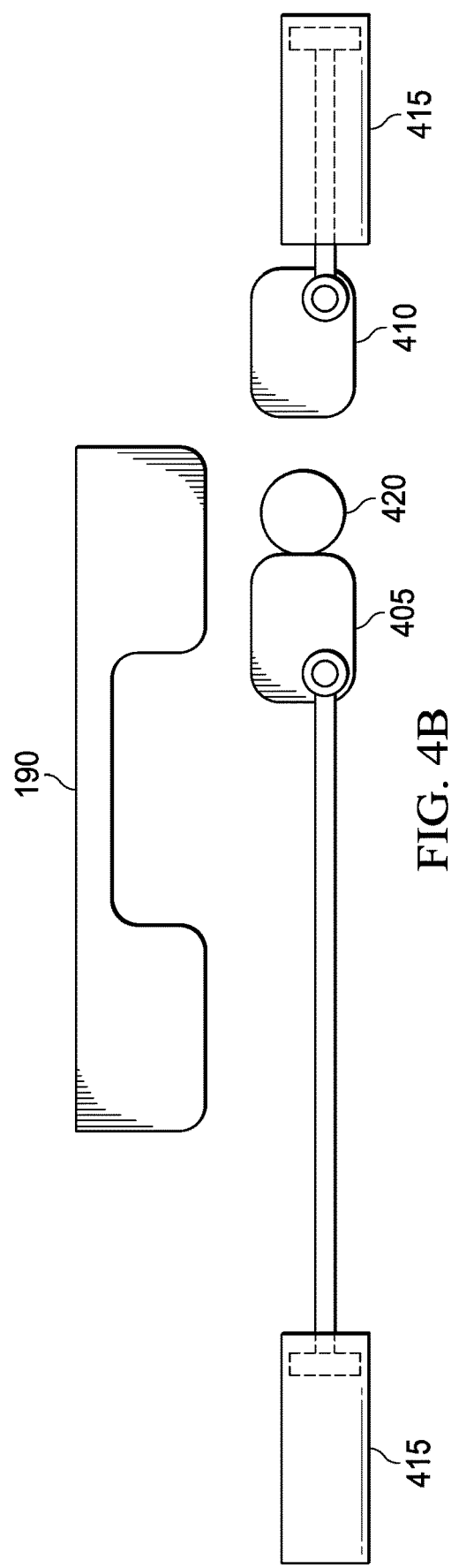

10,766,693 B2

RECEIVER ACTUATION SYSTEM FOR OPENING A GATE ON A PORTABLE BULK MATERIAL CONTAINER

BACKGROUND

Portable bulk material containers are used in the oilfield for delivery and storage of proppant for hydraulic fracturing operations. The containers can be initially moved to the well site by transport and then moved around the well site with forklifts and are ultimately placed on a discharge actuation apparatus which routes the contents of the container to the fracturing blender where the proppant is mixed into the fracturing fluid. During fracturing operations many containers of proppant may be required, and the time between container exchanges can be as short 2 to 2.5 minutes. These bulk containers often have a sliding gate located at the bottom of a funnel chute through which the bulk material is discharged from the container. During each re-fill cycle, care is taken to make sure that the sliding gate is closed sufficiently to prevent any bulk material from inadvertently being discharged from the container during transport. In such containers, a gate pin is located below and centered on the gate, and is used by bulk receivers to open and close the gate. To prevent the gate from inadvertently opening during transport, the gate assembly often includes a keeper that hinges down when the container is in transport and captures the gate pin by way of a slot formed in the keeper that limits the travel of the pin, and thus the gate, to ensure that the gate does not open during transport.

BRIEF DESCRIPTION OF THE DRAWINGS

For a detailed description of the preferred embodiments of the invention, reference will now be made to the accompanying drawings in which:

FIG. 1B is an enlarged view showing the position of the receiver and gate pin with respect to a bulk container's keeper in an open position.

FIG. 4A illustrates an alternative embodiment of the driver mechanism;

FIG. 4B illustrates the alternative embodiment of the driver mechanism of FIG. 4A wherein the gate pin is in an open position;

DETAILED DESCRIPTION

As discussed above, sliding gates are used to control the discharge of materials from bulk material containers. In certain applications where the bulk material containers are portable, the mechanism that actuates the gate is not permanently affixed to the container, but instead, is part of the discharge stand on which the bulk container is placed. The embodiments of this disclosure provide a discharge actuation apparatus that is configured to not only fully open and close the gate, but it is also configured to move the gate pin of a bulk container to a neutral position with respect to a keeper slot of the bulk container and a receiver slot of the discharge actuation apparatus to a "neutral" position. As used herein and in the claims, a "gate pin" is not limited to a circular configuration but includes any protrusion, such as a tab, blade, or rib, that extends from the gate that allows the discharge actuation apparatus to receive or capture that protrusion and provide a linear force to the gate to move it. This neutral position places the gate pin in proper alignment with respect to both the receiver slot and the keeper slot to reduce the likelihood of damage to the discharge actuation apparatus or the bulk container during, at least, the container's removal from the discharge actuation apparatus. As used herein and in the claims, a "neutral" position is a position where the outer dimension of the gate pin is in an offset position from the inner walls of both the receiver slot and the keeper slot such that the gate pin does not contact the inner walls of the receiver slot or keeper. Thus, in a neutral position, the gate pin will not be in contact with either of the receiver's or the keeper's inner slot walls. Instead, it will be respectively located between them, thereby reducing the likelihood of damage to the discharge actuation apparatus or the bulk container during container exchange operations.

The return to neutral position reduces the occurrence for damage to the actuation system by returning the gate actuator to the neutral position after it is closed. Additionally, without the return to a neutral position, experience has shown that incidents regularly occur where the receiver is put in a bind from the contact with the gate pin when installing a new container on the discharge actuation apparatus. This results in binding and prevents the container from opening and may damage the receiver. When this occurs the container must be lifted off and then reinstalled or repaired. The additional time required to reposition the container can cause potential proppant shortages to the blender, since the exchange time for each container is very short, on the order of minutes. The return to a neutral position feature is straightforward to implement and can greatly increase the reliability of a containerized proppant delivery system.

Figure 1A:
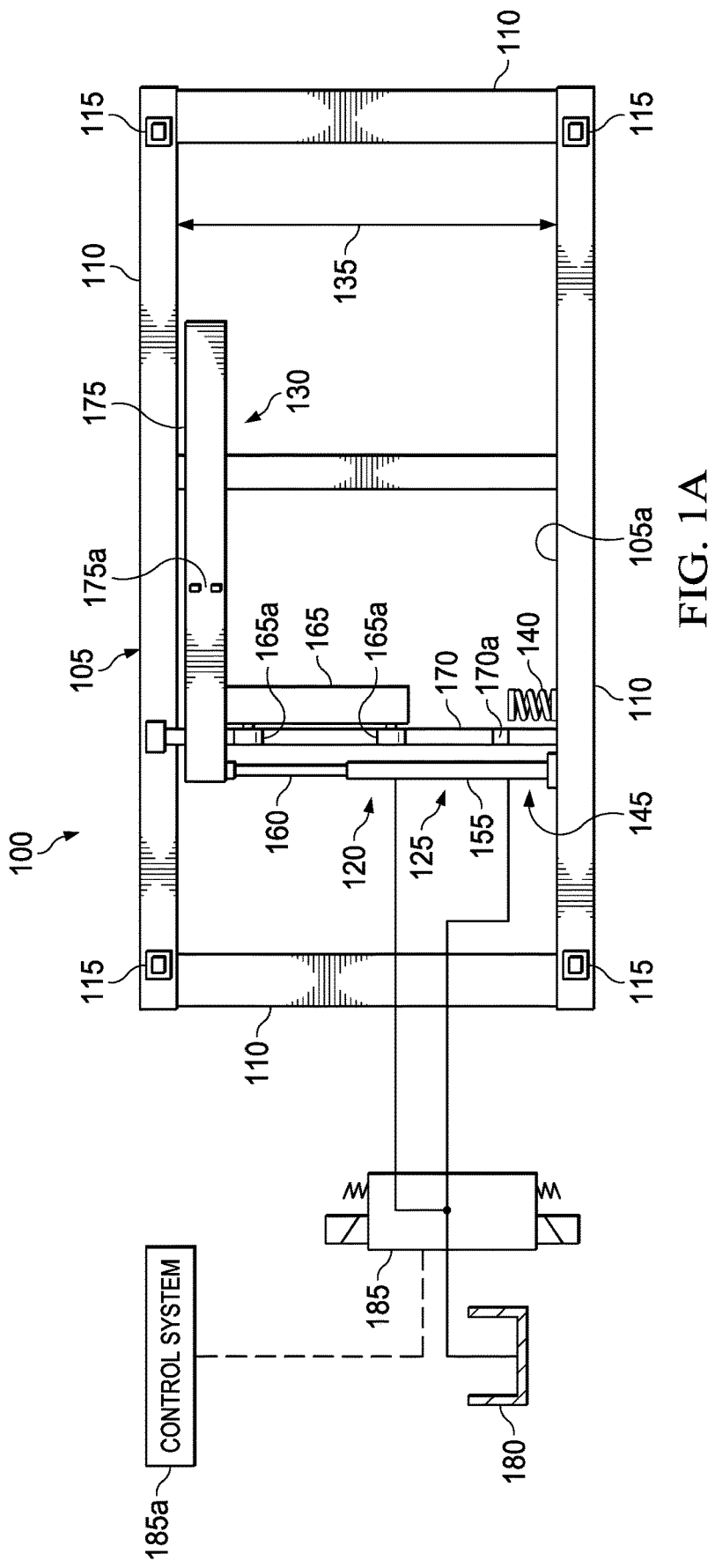
FIG. 1A is a view of one embodiment of a discharge actuation apparatus in a position where the bulk container's gate pin in an open position.

FIG. 1A illustrates one embodiment of this disclosure that provides a discharge actuation apparatus 100 for opening a sliding gate of a typical portable bulk material container by way of the gate pin that is captured in a keeper during transportation. The embodiment of FIG. 1A comprises a base frame structure 105 that has joined structural members 110 that form opposing corners, e.g., 4 corners as shown, and has a design and support strength to receive a portable bulk material container thereon. As used herein and in the claims "design, designed, or configured" means that the recited component has the accompanying physical structural components and strength sufficient to perform the stated purpose. In one embodiment, the design may be a generally rectangular shape, where four base frame structure structural members 110 are joined to form four corners, as shown. However, in another embodiment, the structural members 110 may include one or more diagonal structural members that join parallel structural members to form the corners of the base frame 105, however, other base structural designs may be used.

The embodiment of the discharge actuation apparatus 100 illustrated in FIG. 1A further comprises an alignment feature 115 located at or adjacent at least two opposing corners of the base frame structure 105. However, in another embodiment, the alignment features 115 are located at or adjacent each of the corners of the base frame structure 105, as shown in the illustrated embodiment. In one embodiment, the alignment feature 115 is an alignment pin that is designed to be received in a corresponding alignment opening of the bulk container. In another embodiment, for example, the alignment feature may be an optical apparatus with appropriate sensor systems, such as a transmitter or receiver that corresponds to an optical apparatus located on corresponding corners of the bulk container. These embodiments are given as examples only, and it is readily apparent that other types of alignment features are within the scope of this disclosure.

The embodiment of the discharge actuation apparatus 100 illustrated in FIG. 1A further comprises a driver mechanism 120 coupled to the base frame structure 105. As explained below, the driver mechanism 120 may include different mechanical configurations. For example, in one embodiment, the driver mechanism 120 that has a housing 125, that houses or supports driver components of the driver mechanism 120. A gate pin engaging element 130 is coupled to the driver mechanism 120. The gate pin engaging element 130 is movable along a width 135 of the base frame structure 105 and is engageable with a gate pin of a portable bulk material container when the portable bulk material container is positioned on the base frame structure 105. In FIG. 1A, the gate pin engaging element 130 is shown to be in a first position, e.g., a position that it would be in after opening the sliding gate of the bulk container. The driver mechanism 120 is designed to move the gate pin engaging element 130 from at least a first position, to a second position, and to a neutral position located between the first and second positions.

In one embodiment the driver mechanism 120 comprises a cylinder 145 having an end coupled to a first side 105a of the base frame structure 105 and a driver arm 160 that is extendable from the cylinder 145 and across a portion of the width 135 of the base frame structure 105 from the first position to the second position. The cylinder 145 is coupled to the gate pin engaging element 130 by way of the driver arm 160. The cylinder 145 may different type of mechanical configurations. For example, the cylinder 145 may be a fluid actuated cylinder, such as a hydraulic cylinder or a pneumatic cylinder. Moreover, in such embodiments, the driver mechanism 120 may include a fluid tank 180 and control valve 185 that are fluidly connected to the fluid cylinder 155.

In yet other embodiments, the driver mechanism 120 may be electrically or linearly actuated or driven by a motor. Examples of such embodiments include, without limitation, a geared motor that is rotatably coupled to a screw arm that extends from a housing when turned by the motor, or a gear or tractor driven body that causes movement along the width 135 of the base frame structure 105, or in yet another embodiment it may also be a chain or belt driven system.

In one embodiment, the driver mechanism 120 further comprises a support member 165 movably coupled to the base frame structure 105 such that it can move along the width 135 of the base frame structure 105. In one embodiment, the support member 165 is movably coupled to a cross member 170 that extends across the width 135 of the base frame structure 105. The support member 165 is movably coupled to the cross member 170 by wheels 165a that roll along opposing sides of the cross member 170, of which only the upper wheels 165a can be seen in this view.

In one embodiment, the gate pin engaging element 130 comprises a receiver plate 175 coupled to the support member 165 that has a gate pin receiver slot ("receiver slot") 175a located thereon. The driver arm 160 is coupled to the support member 165 to produce movement of the support member 160 along the width 135 when the cylinder 145 is actuated. The receiver slot 175a may be a single slot, or in other embodiments, the receiver slot 175a may be two or more slots laterally aligned along a length of the base frame structure 105. The receiver slot(s) 175a is/are configured to receive a gate pin of the bulk container when it is positioned on the discharge actuation apparatus 100. In one embodiment, the receiver slot 175a has a slot width that is greater than a slot width of the keeper slot of the bulk container. For example, the keeper slot is typically about 6" wide. In such cases, the receiver slot 175a may have a width of at least 6.25" (inches), or wider, for example, being as much as 8" to 10" wide, thus the width of the receiver slot 175a may be 0.25" to 4" wider than the typical keeper slot. This additional width, along with the receiver slot 175a being positionable in the neutral position, ensures that the gate pin and the receiver slot 175a will not be damaged during container exchanges.

In one embodiment, the biasing member 140 is located between the base frame structure 105 and the support member 165 and provides a biasing force between the two during operation. In one embodiment, the biasing member 140 has a first end that is coupled to a side 105a of the base frame structure 105 and a second, opposing end engageable against the support member 165 to exert a biasing force against the support member 165, which moves the receiver 175, and thus the receiver slot 175a, to the neutral position. In another embodiment, the biasing member 140 has a first end that is coupled to the support member 165 and a second, opposing end engageable against the side 105a of the base frame structure to exert a biasing force against the support member 165, which moves the receiver 175 and receiver slot 175a to the neutral position.

In one embodiment, the biasing member 140 may be a spring, such as a compression spring, a torsion spring, a pneumatic spring, or microcellular polymer spring, any of which whose tension may be adjusted to control a preload. For example, the biasing member 140 is adjustable such that it always is partially compressed, which ensures that the biasing member 140 has adequate force to overcome the friction in the fluid cylinders, for example, and move it to the neutral position.

In another embodiment, in place of the biasing member 140, a typical limit switch, transducer, or other sensor, generally designated 170*a*, which is coupled to a typical control system 185*a*, could be positioned and used to indicate the neutral position. In one embodiment, the control system 185*a* may be incorporated into the hydraulic control valve 185. Alternatively, the control system 185*a* may be separate from the hydraulic control valve 185, as shown. In such embodiments, the control system 185*a* may include a known computer system having a processor, computer-readable storage media and memory associated therewith and appropriate executable software stored thereon configured to operate the associated hydraulic valve 185.

In those embodiments involving a limit switch 170*a*, the limit switch 170*a* is coupled to hydraulic control valve 185 through the control system 185*a*. Once the control system 185*a* has moved the receiver to the closed position, the limit switch could send a reverse signal to the control system 185*a* coupled to the hydraulic control valve 185 to cause the hydraulic control valve to move the receiver slightly to the neutral position. The control system 185*a* would send a stop control signal to the hydraulic valve 185 once the limit switch is tripped. Examples of limits include, without limitation, non-contact inductive switch, electro-mechanical contact switch or a photo switch. Depending on the movement speed of the discharge actuation apparatus 100 and the response time of the control system 185*a*, it may be necessary to place the limit switch some distance off of the desired neutral position. This may be done to compensate for any overshoot in position that occurs after the limit switch is triggered.

In an alternative embodiment, a proportional feedback transducer 170*a* that is coupled to the hydraulic control valve 185 through the control system 185*a* may be used to indicate the receiver slot's 175*a* position. The transducer 170*a* provides a way to indicate the receiver slot's 175*a* position instead of only knowing when the receiver slot 175*a* is at the end of travel in either direction or in a neutral position. Unlike the limit switch, if the receiver slot 175*a* overshoots the desired neutral position, the control system can reverse the travel of the receiver to move it back into position.

FIG. 1B illustrates an enlarged schematic view of a keeper 190 and keeper slot 195 of a bulk container and the position of the gate pin 195*a* in the receiver slot 175*a* after being moved from a neutral position to an open position. Though a circular gate pin is illustrated, as defined above, the gate pin may have a number of configurations and thus, is not limited to just the illustrated embodiment. Though the neutral position in this embodiment is shown to be in the center of the keeper slot 195, it should be understood that the neutral position, as defined above, could be either side of the center position. Moreover, it should be understood that the keeper 190 is shown in a first position in which the gate pin would be captured in the keeper slot 195 for illustration purposes only and that at this point, the keeper 190 would be pivoted to a second position that would allow movement of the gate pin as the bulk container is being set onto the discharge actuation apparatus 100.

Figure 2A:
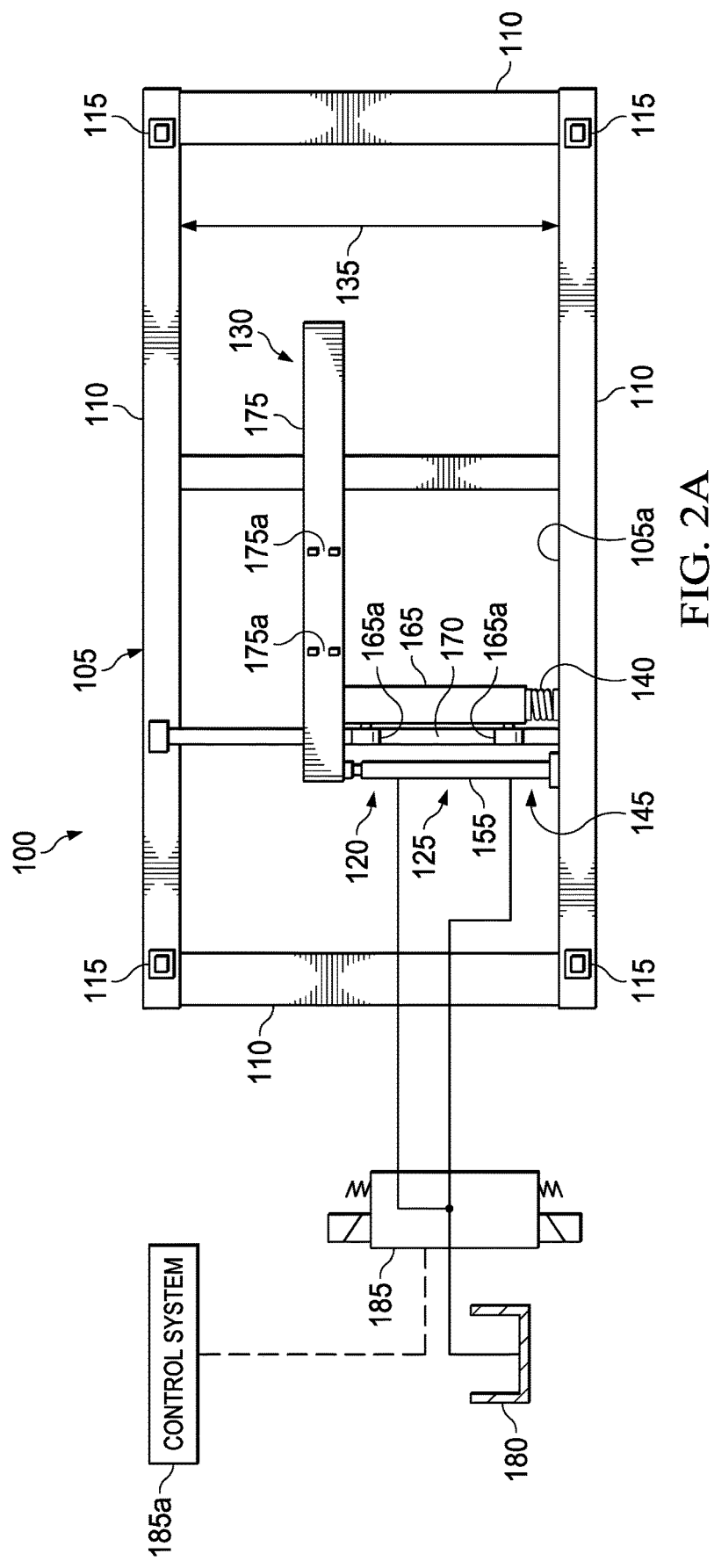
FIG. 2A is a view of the embodiment of FIG. 1A where the discharge actuation apparatus is in a position where the bulk container's gate pin is in a closed position.

FIG. 2A illustrates the embodiment of FIG. 1A, where the receiver 175, and thus the receiver slots 175*a* (two are illustrated in this embodiment) is in a second, e.g., closed, position. In this position, the operation of the driver mechanism 120 has been operated in a reverse fashion to move the support member 165 and the receiver 175 and receiver slot 175 to the second position. As seen, in this position, the support member 165 is pressed against the biasing member 140, which will cause the biasing member 140 to exert a counter directional force against the support member 165.

Figure 2B:
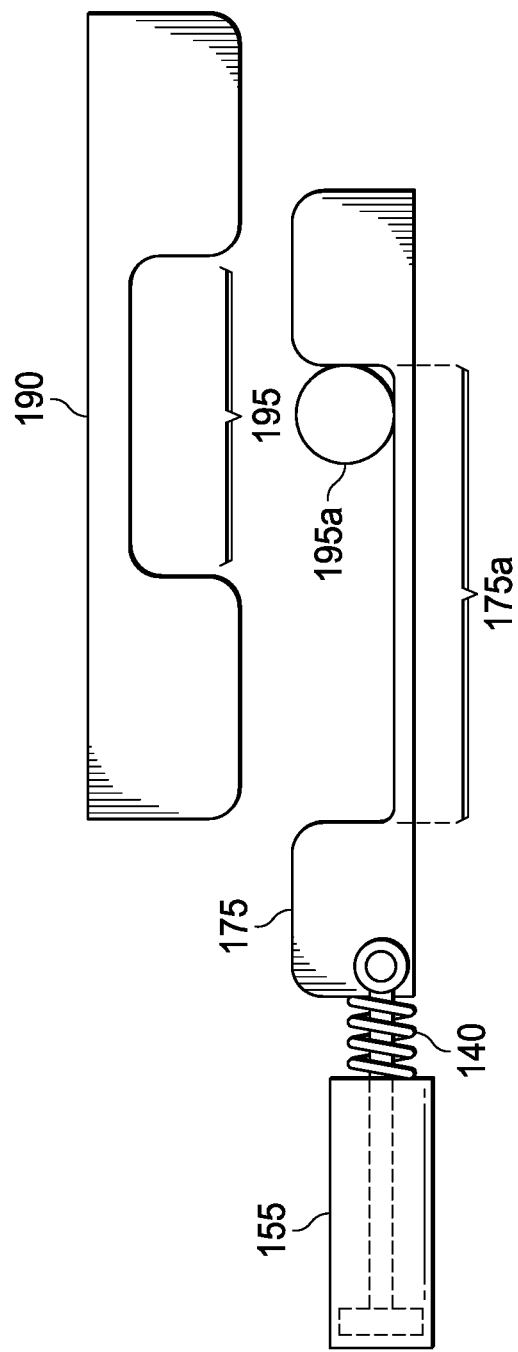
FIG. 2B is an enlarged view showing the position of the receiver and gate pin with respect to a bulk container's keeper in a closed position.

FIG. 2B illustrates an enlarged schematic view of FIG. 2A showing the relative positions of the keeper 190, receiver slot 175*a*, and gate pin 195*a* after being moved to the closed position. As seen, the biasing member 140 is compressed and ready to return the receiver slot 175*a* to a neutral position. At this point, the gate pin 195*a* is in a neutral position regarding the keeper slot 195. However, the receiver slot 175*a* is not yet in the neutral position, as the biasing member 140 has not yet moved the receiver 175, and thus the receiver slot 175*a*, to the neutral position. Though the neutral position in this embodiment is shown to be in the center of the keeper slot 195*a*, it should be understood that the neutral position, as defined above, could be either side of the center position. Moreover, it should be understood that the keeper 190 is shown in the first position to illustrate relative positions only and that at this point, the keeper 190 would be pivoted to a second position as the bulk container is set onto the discharge actuation apparatus 100, as previously stated.

Figure 3A:
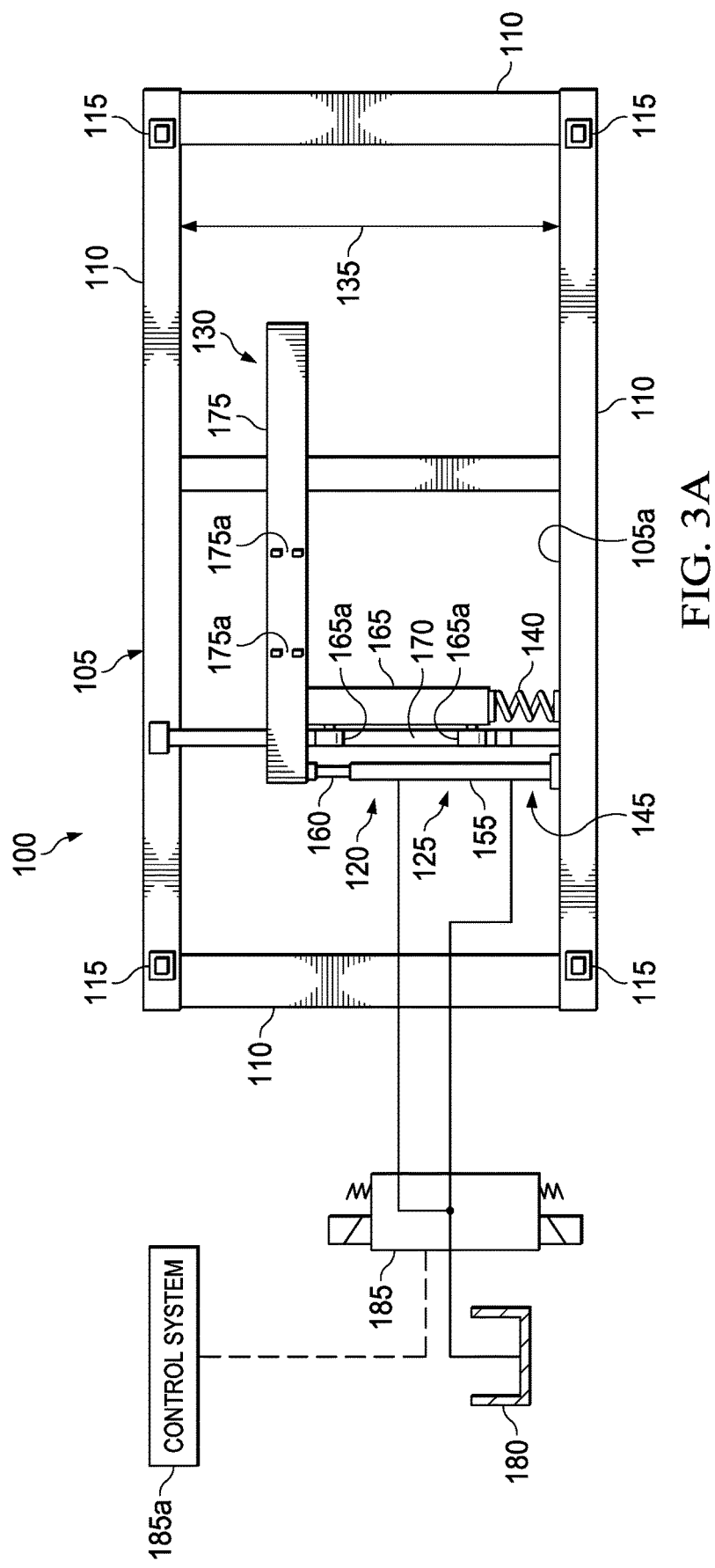
FIG. 3A is a view of the embodiment of FIG. 1A where the discharge actuation apparatus is in a position where the bulk container's gate pin in a neutral position with respect to the bulk container's keeper slot and the receiver's slot.

FIG. 3A illustrates the embodiment of FIG. 1, in a position where the receiver 175, and thus the receiver slots 175*a* (two are illustrated in this embodiment), have been moved to the neutral position. As seen, in this position, the compression of the biasing member 140 caused it to exert a counter directional force against the support member 165 and move the receiver 175, and thus the receiver slots 175*a*, to the neutral position when force is no longer applied by the cylinder 145. Once the support member 165 and receiver 175 stop at the neutral position, in one embodiment, the fluid pressure is released through the inlet and outlet ports on the fluid cylinder 155 so that the cylinder can float, for example by using a 4 way 3 position control valve. The stored energy in the biasing member 140 is relieved as it pushes the support member 165 and the receiver 175 to the neutral position.

Figure 3B:
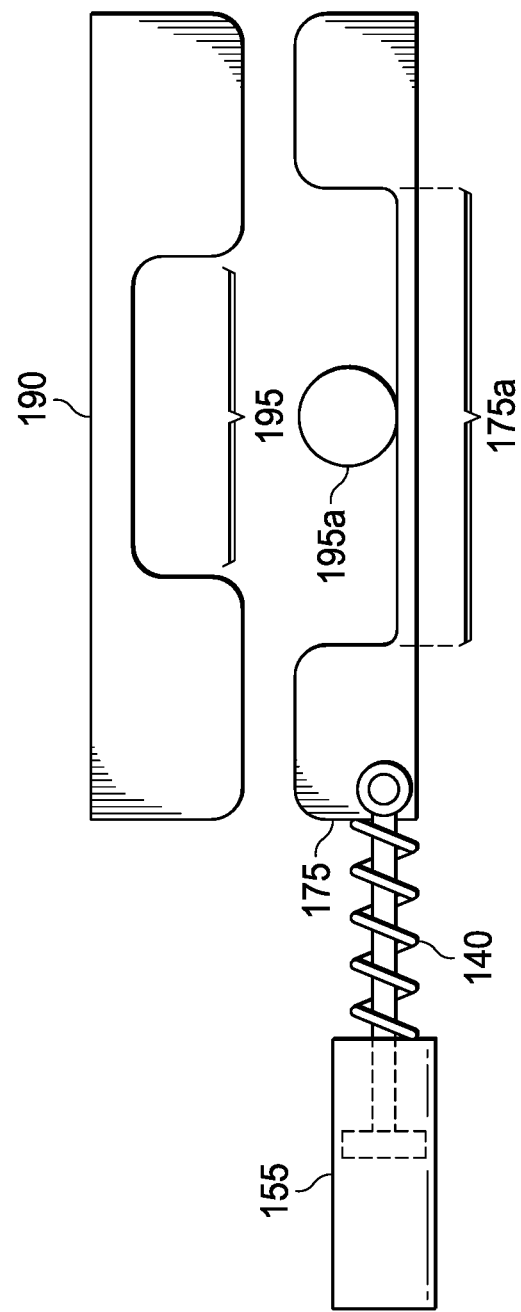
FIG. 3B is an enlarged view showing the bulk container's gate pin in a neutral position with respect to the bulk container's keeper slot and the receiver's slot.

FIG. 3B illustrates an enlarged schematic view of FIG. 3A showing the relative positions of the keeper 190, receiver slot 175*a*, and gate pin 195*a* after being moved from the closed position to the neutral position. As seen, the biasing member 140 is in a decompressed state following the release of the biasing force generated by the cylinder 145. The receiver slot 175*a* is in the neutral position and the driver arm 160 is slightly extended. At this point, both the receiver slot 175*a* and the gate pin 195*a* are in a neutral position. Though the neutral position, in this embodiment, is shown to be in the center of the receiver slot 175*a* and the keeper slot 195*a*, it should be understood that the neutral position, as defined above, could be either side of the center position. Moreover, it should be understood that the keeper 190 is shown in the first position to illustrate relative positions only and that at this point, the keeper 190 would be pivoted to a second position from being set onto the discharge actuation apparatus 100, as previously stated.

Figure 4C:
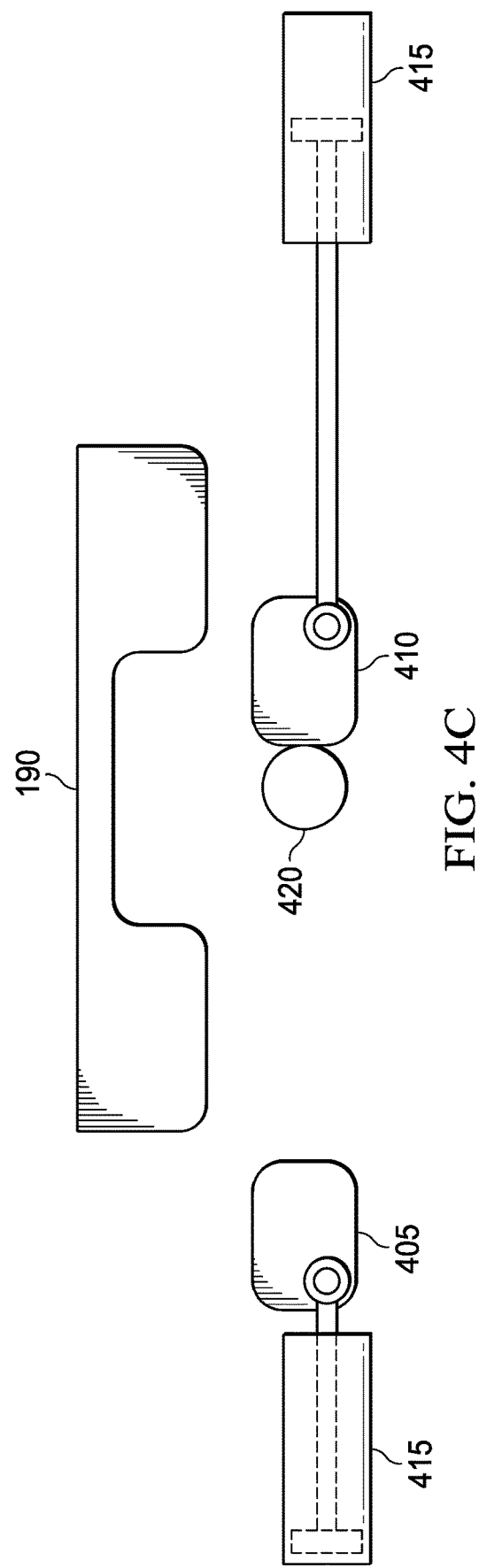
FIG. 4C illustrates the alternative embodiment of the driver mechanism of FIG. 4A wherein the gate pin in in a neutral position.

FIG. 4A illustrates another embodiment where the support member 165, receiver 175, and receiver slot 175*a* are replaced with two opposing pushers 405, 410 that are respectively driven by a driving mechanism 415, such as a cylinder, as described above regarding other embodiments. Depending on the direction, the appropriate pusher 405, 410 is driven to engage the gate pin 420 of the bulk container from a neutral position, shown in FIG. 4A. The pushers 405, 410 would retract in opposite directions such that both pushers 405 are out of the way when exchanging containers. For example, as shown in FIG. 4B, one pusher 405 moves the gate 420 to the open position. The other pusher 410 would be extended to push the gate pin 420 to the closed position and then retracted to the neutral position, as shown in FIG. 4C.

Figure 5A:
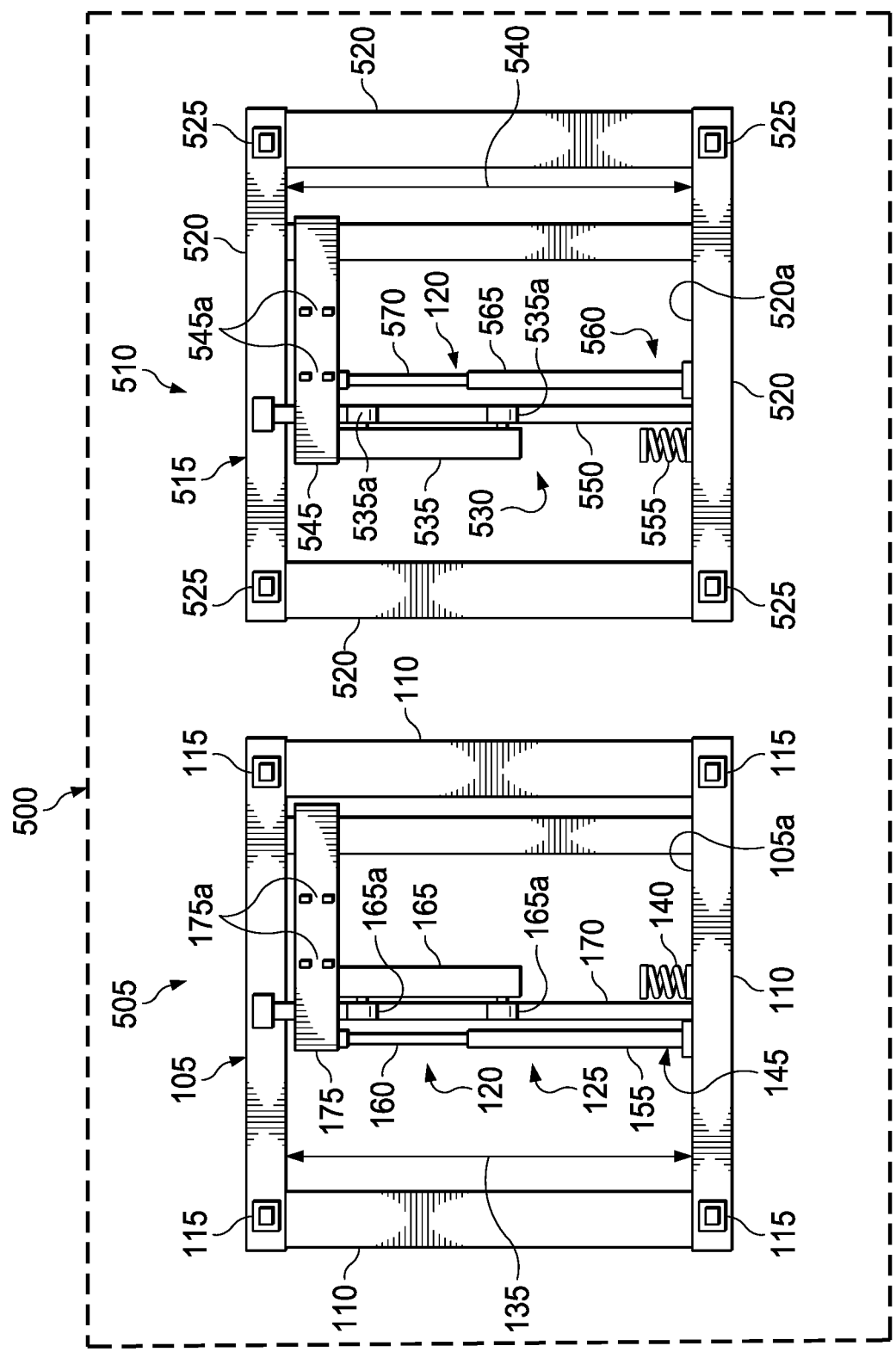
FIG. 5A illustrates another embodiment of the discharge actuation apparatus having multiple discharge actuation stations to operate gates on multiple containers.

FIG. 5A illustrates another embodiment of the discharge actuation apparatus 500 that comprises multiple discharge actuation stations 505, 510, embodiments of which are described above regarding discharge actuation apparatus 100. Thus, the discharge actuation station 510 has a base frame structure 515, structural members 520, and alignment features 525, as discussed above. In the embodiment illustrated in FIG. 5A, the driver mechanism 125 of actuation station 505 is a first driver mechanism, and the discharge actuation apparatus 500 further comprises a second driver mechanism 530. The various embodiments of the driver mechanism 530 may be the same as those described above regarding driver mechanism 125. In one embodiment, the second driver mechanism 530 includes a second support member 535 that is movable along a width 540 of the base frame structure 515. The second support member 535 is movably coupled by wheels 535*a* to and supports a second receiver plate 545 that has a receiver slot 545*a* therein. The second support member and receiver plate 535, 545 are movable along a second cross support member 550 by the wheels 535*a* (only upper wheels 335*a* are seen) that ride on opposing sides of the second cross support member 550. In one embodiment, the second driver mechanism 530 comprises a second biasing member 555. In this embodiment, the second driver mechanism 530 further includes a second cylinder 560. Similar to previous embodiments, the second cylinder 560 may be a fluid actuated cylinder. In one embodiment, the second cylinder 560 comprises a second housing 565 with an end coupled to a first side 520*a* of the base frame structure 515. A second driver arm 570 extends from the second housing 565 across a portion of the width 540 of the discharge actuation station 510 from at least the first position to the second position and to the neutral position located between the first and second positions.

Figure 5B:
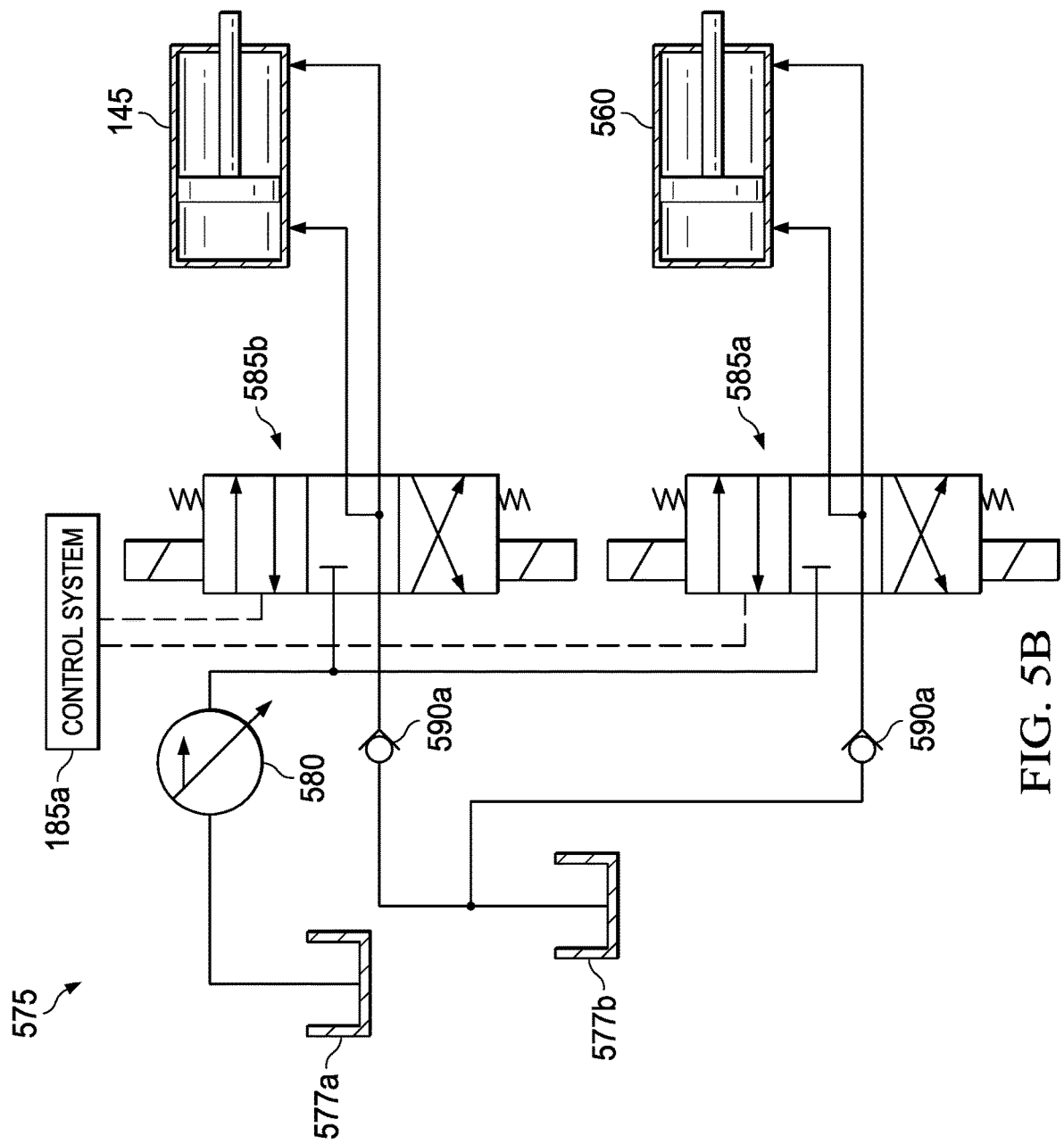
FIG. 5B is a schematic view of a hydraulic valve system used to actuate the multiple discharge actuation systems of FIG. 5A.

Such embodiments may also include a known hydraulic control system 575, an embodiment of which is schematically shown in FIG. 5B and which has the control system 185*a* as described above with respect to other embodiments. In the embodiment illustrated in FIG. 5B, the hydraulic control system 575 includes first and second fluid tanks 577*a* 577*b*, configured to hold a fluid, such as a hydraulic fluid or a gas and a pump 580. The first fluid tank 577*a* is fluidly coupled to a first hydraulic control valve 585*a*. The second fluid tank 577*b* is fluidly coupled to the cylinder 145 and cylinder 560 through a second hydraulic control valve 585*b* and check valves 590*a* and 590*b*.

When multiple receivers 505, 510 are present, it may be necessary to hydraulically isolate the cylinders attached to each receiver. Otherwise, the operation of one receiver could create a high enough pressure in the tank line that the other receivers extend off of the neutral position. When the hydraulic control valve is in the middle position, both cylinder ports are in communication with the tank port. When the tank pressure is applied to the unequal areas on both sides of the cylinder, it is possible for the cylinder to extend. To eliminate tank pressure from feeding back to the cylinder ports, a check valve can be placed downstream from the tank port on the control valve. An alternate method for addressing this issue would be to mount the cylinders such that they are retracted to place the receiver in, for example, an open position and extended to place the receiver in the neutral position. Thus, the tank pressure's tendency to extend the cylinder would be counteracted by the preload in the spring.

Figure 6A:
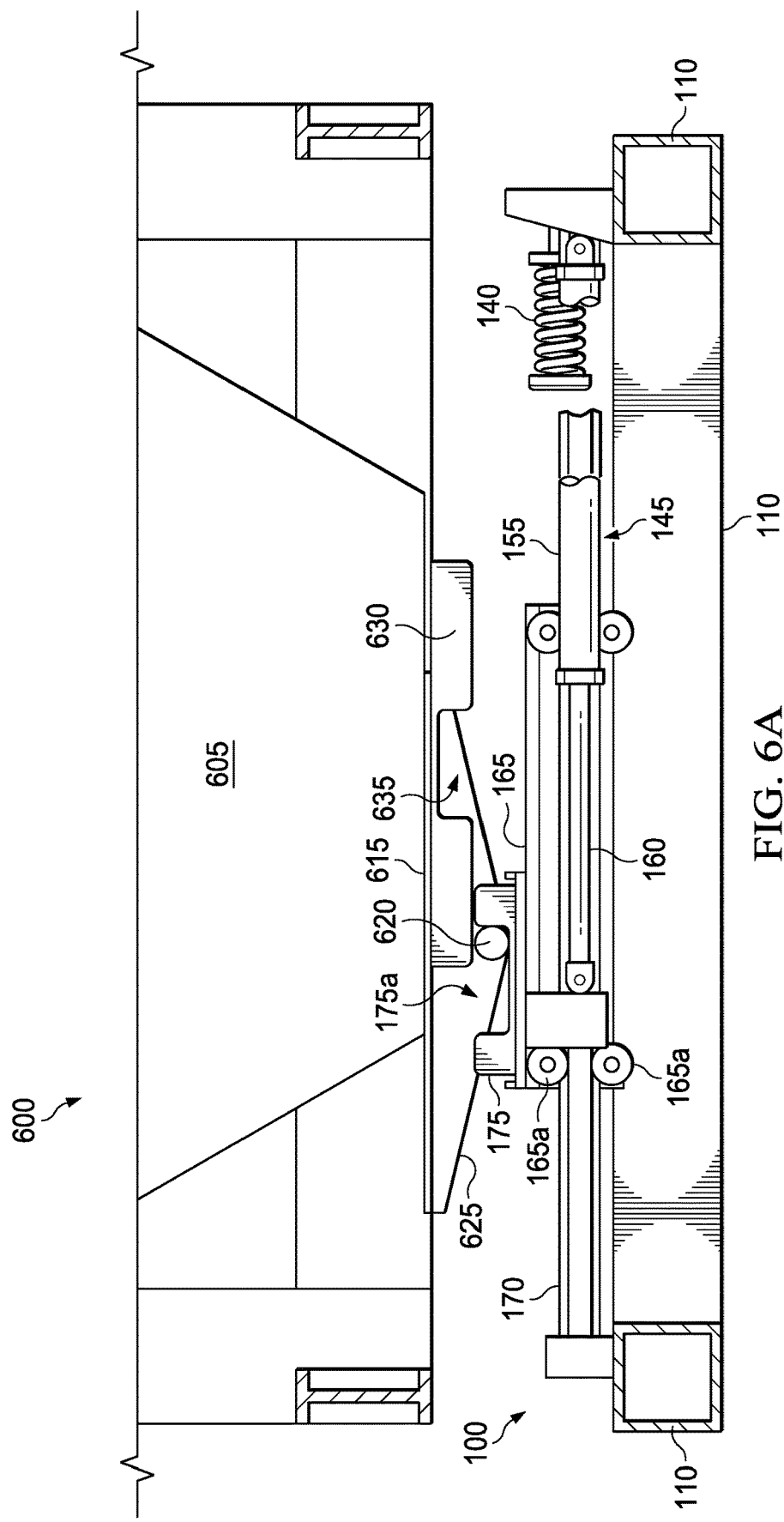
FIG. 6A illustrates an embodiment of a bulk material delivery system where the gate of the bulk container is in an open position.

FIG. 6A illustrates a view of a bulk material delivery system 600 that implements an embodiment of the discharge actuation apparatus 100, as described above, thus, the same reference numbers are used to identify the various components of this embodiment, where applicable. As explained above, the bulk material container 605 and the discharge actuation apparatus 100 have alignment features, which are not shown in this view, and a geometrical configuration that allows the bulk material container 605 to be placed onto and supported by the discharge actuation apparatus 100. In such instances, the discharge actuation apparatus 100 is operatively coupled to a typical bulk material container 605. The bulk material container 605 has a material storage area 610 that is contained by a movable gate ("gate") 615 located at the bottom of the material storage area 605, which in the illustrated embodiment, is a horizontal movable gate. A gate pin 620 and sliding assembly 625 are operatively connected to the gate 615 to move the gate 615 to open and closed positions, as discussed above. Also, as discussed above, a keeper 630 contains the gate pin 620 in keeper slot 635 and limits its movement to prevent the gate 615 from inadvertently moving to an open position.

FIG. 6A illustrates the gate 615 in an open position. In this configuration, the driver arm 160 is fully extended from the cylinder 145 of the cylinder 145, and the gate pin 620, which as discussed above includes other types of protrusions, is positioned against the right side driving wall of the receiver 175. It should be understood that the keeper 630 is shown in the first position for illustration purposes only and that at this point, the keeper 630 would be pivoted to a second position, as previously stated.

Figure 6B:
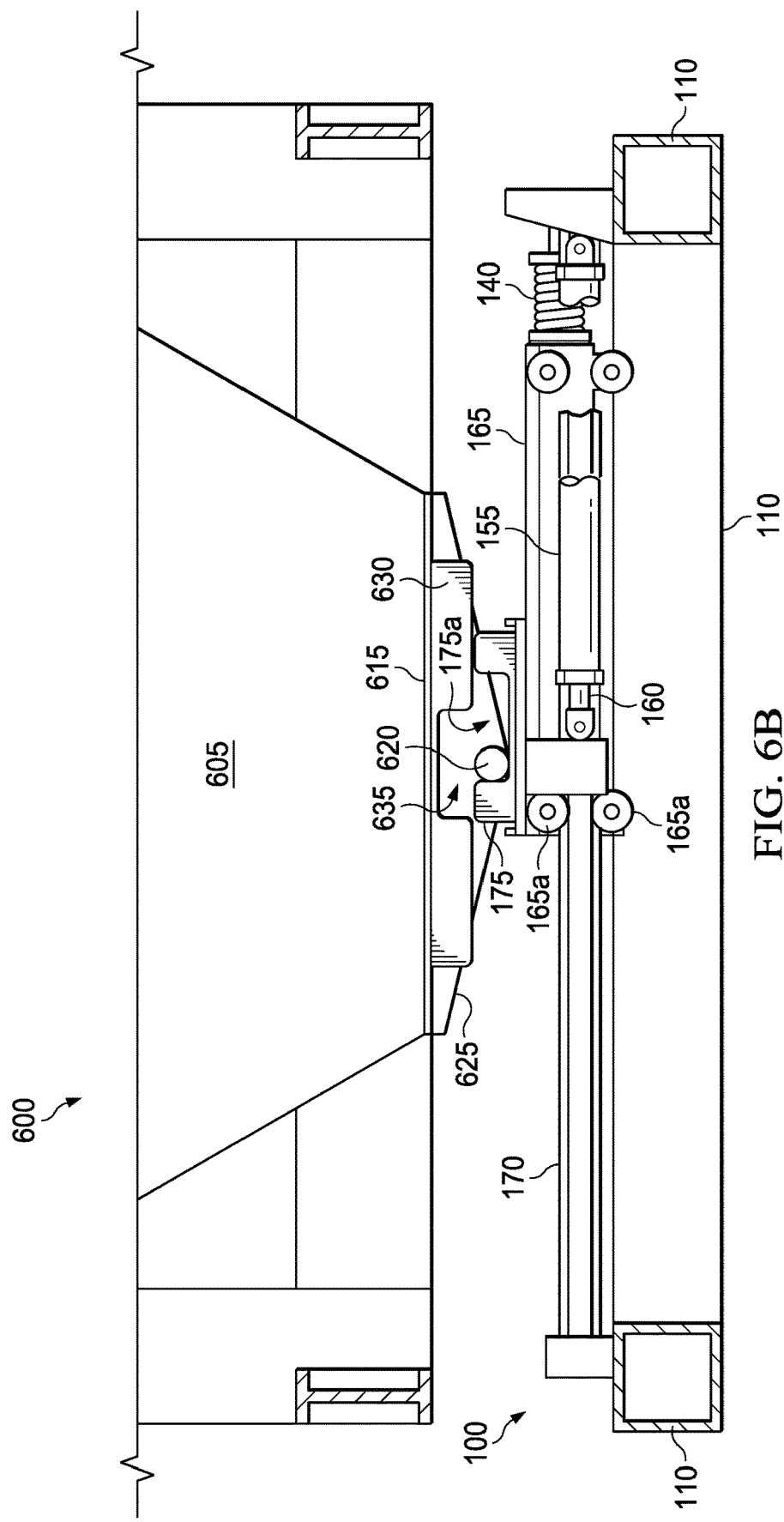
FIG. 6B illustrates the embodiment of the bulk material delivery system of FIG. 6A where the gate of the bulk container is in a closed position.

FIG. 6B illustrates the bulk material delivery system 600 at the point the gate is closed. As seen in this view, the left side driving wall of the receiver 175 is against the gate pin 620 after having pulled it back to the closed position, and the gate pin 620 is in a neutral position with respect to the keeper slot 635, that is the gate pin 620 would not contact either of the side walls of the keeper slot 635 when moved back to the first position. Also, in this position, the biasing member 140 is compressed and ready to push back against the support member 165 that carries the receiver 175 when the hydraulic pressure is released. It should be understood that the keeper 630 is shown in the first position for illustration purposes only and that at this point, the keeper 630 would be pivoted to a second position, as previously mentioned.

Figure 6C:
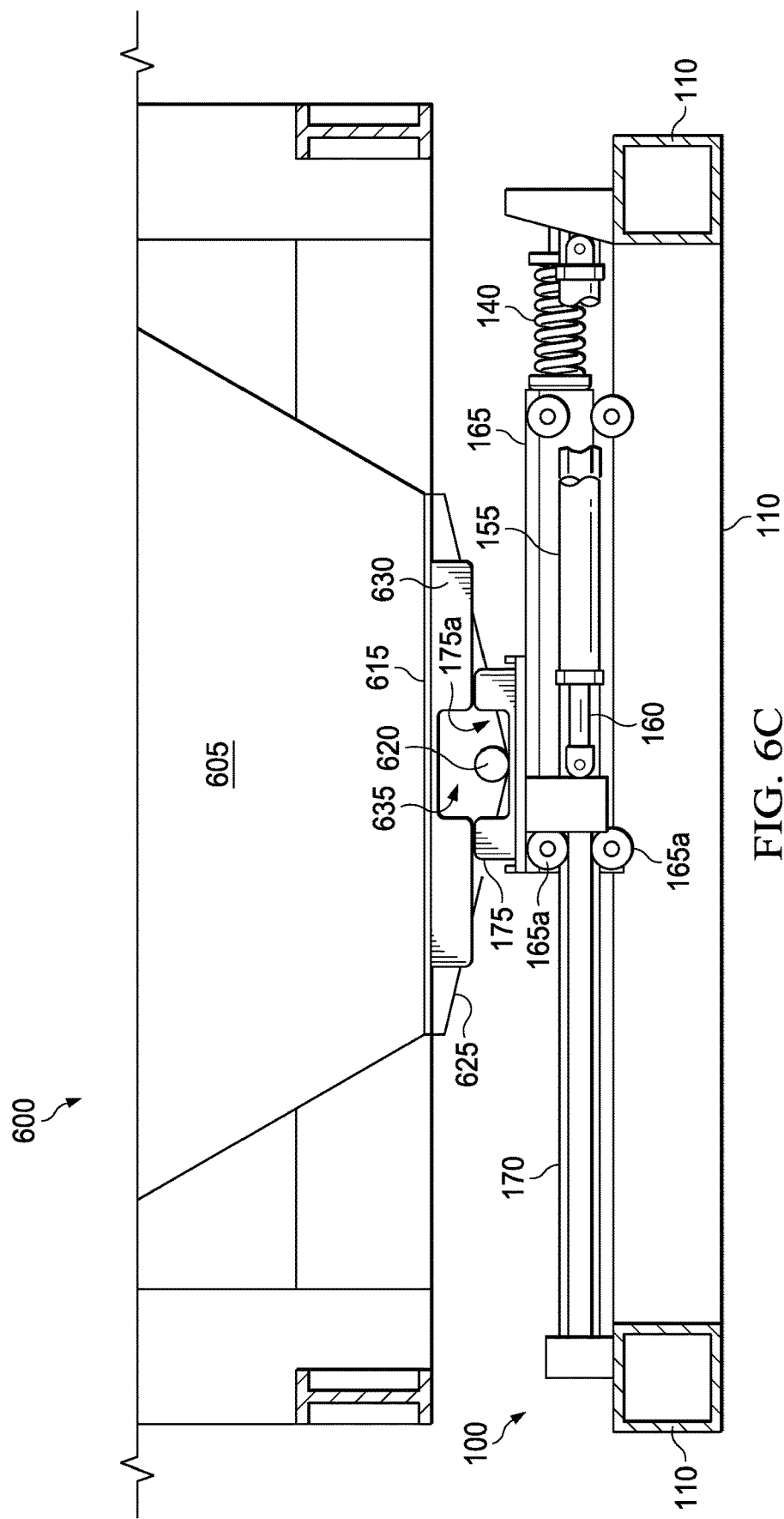
FIG. 6C illustrates the embodiment of the bulk material delivery system of FIG. 6A where the gate of the bulk container is in a neutral position with respect to the keeper slot of the bulk container and the receiver slot of the discharge actuation system.

FIG. 6C illustrates the bulk material delivery system 600 following the decompression of the biasing member 140 that pushes the receiver 175 to a neutral position. As seen in this view, the gate pin 620 will be in a neutral position with respect to the keeper slot 635 when the keeper 630 is pivoted back to a first position, and it is also in a neutral position with respect to the receiver slot 175*a*, thereby minimizing the likelihood of damage to the discharge actuation apparatus 100 or the bulk material container 605. Also, in this position, the biasing member 140 is in a decompressed position. It should be understood that the keeper 630 is shown in the first position for illustration purposes only and that at this point, the keeper 630 would be pivoted to a second position, as previously mentioned.

The invention having been generally described, the following embodiments are given by way of illustration and are not intended to limit the specification of the claims in any manner.

Embodiments herein comprise:

A discharge actuation apparatus for opening a gate on a portable bulk material container. This embodiment comprises A discharge actuation apparatus for opening a gate on a portable bulk material container. In one embodiment, the discharge actuation apparatus comprises a first base frame structure configured to receive a first portable bulk material container thereon. A first driver mechanism is coupled to the first base frame structure and a first gate pin engaging element having a first gate pin receiver slot is coupled to the first driver mechanism. The first gate pin engaging element is movable along a width of the first base frame structure by the first driver mechanism. The first gate pin engagement slot is engageable with a gate pin of the first portable bulk material container when positioned on the first base frame structure. The first driver mechanism is configured to move the first gate pin engaging element from at least a first position, to a second position, and to a neutral position located between the first and second positions.

Another embodiment is directed to a bulk material delivery system. This embodiment comprises a portable bulk container comprising: a material storage area, a slideable gate located at the bottom of the material storage area, a gate pin coupled to a sliding assembly that is operatively connected to the slideable gate to move the slideable gate to at least an open position or closed position, a keeper pivotably coupled to the sliding assembly from a first keeper position to a second keeper position and having a keeper slot formed therein that captures the gate pin within the keeper slot and limits movement of the gate pin when the keeper is in the second keeper position, and a discharge actuation apparatus for moving the slideable gate on the portable bulk material container. The discharge actuation apparatus comprises a base frame structure configured to receive the portable bulk material container thereon. A driver mechanism is coupled to the base frame structure, and a gate pin engaging element having a gate pin receiver slot is coupled to the driver mechanism. The gate pin engaging element is movable along a width of the base frame structure by the driver mechanism. The gate pin receiver slot being is engageable with a gate pin of a portable bulk material container when positioned on the base frame structure. The driver mechanism is configured to move the gate pin engaging element from at least a first position, to a second position, and to a neutral position located between the first and second positions.

Each of the foregoing embodiments may comprise one or more of the following additional elements singly or in combination, and neither the example embodiments or the following listed elements limit the disclosure, but are provided as examples of the various embodiments covered by the disclosure:

Element 1: wherein the driver mechanism comprises:
wherein the first driver mechanism comprises: a first biasing member, and a first fluid actuated cylinder having an end coupled to a first side of the first base frame structure and a first driver arm extendable from the first fluid actuated cylinder and across a portion of the width from the first position to the second position and to the neutral position.

Element 2: wherein the first driver mechanism further comprises a first support member movably coupled to the first base frame structure to move along the width of the first base frame structure, and wherein the first gate pin engaging element comprises a first receiver plate coupled to the first support member and having the first gate pin receiver slot located thereon, the first driver arm being coupled to the first support member.

Element 3: wherein the first biasing member is located between the first base frame structure and the first support member and has a first end coupled to one of the first base frame structure or the first support member and a second, opposing end engageable against the other of the first base frame or first support member, respectively, to exert a biasing force to move the first receiver plate to the neutral position.

Element 4: further comprising a second actuation apparatus, and wherein the second actuation apparatus comprises: a second base frame structure configured to receive a second portable bulk material container thereon; a second driver mechanism coupled to the second base frame structure; and a second gate pin engaging element having a second gate pin receiver slot and coupled to the second driver mechanism, the second gate pin engaging element being movable along a width of the second base frame structure by the second driver mechanism, the second pin receiver slot being engageable with a gate pin of the second portable bulk material container when positioned on the second base frame structure, the second driver mechanism configured to move the second gate pin engaging element from at least a first position, to a second position, and to a neutral position located between the first and second positions.

Element 5: wherein the second driver mechanism comprises: a second biasing member, and a second fluid actuated cylinder having an end coupled to a first side of the second base frame structure and a second driver arm extendable from the second fluid actuated cylinder and across a portion of the width of the second base frame structure from the first position, to the second position, and to the neutral position.

Element 6: wherein the second driver mechanism comprises a second support member movably coupled to the second base frame, and wherein the second biasing member is located between the second base frame structure and the second support member and has a first end coupled to one of the second base frame structure or the second support structure and a second, opposing end engageable against the other of the second base frame structure or second support, respectively, to exert a biasing force to move the second gate pin engaging element to the neutral position.

Element 7: wherein the first driver mechanism is a first fluid actuated cylinder and further comprises a hydraulic control valve fluidly coupled to one or more tanks containing hydraulic fluid and fluidly coupled to the first and second fluid actuated cylinders, the hydraulic control valve controlling a flow of hydraulic fluid from the one or more tanks to the first and second fluid actuated cylinders.

Element 8: wherein the first driver mechanism is a fluid actuated cylinder and the first driver mechanism further comprises: a hydraulic control valve fluidly coupled to one or more tanks containing hydraulic fluid and fluidly coupled to the fluid actuated cylinder; and a limit switch coupled to a hydraulic control valve and configured to transmit a signal to the hydraulic control valve to cause the fluid actuated cylinder to move the first gate pin engaging element to the neutral position.

Element 9: wherein the first driver mechanism is a fluid actuated cylinder and the first driver mechanism further comprises: a hydraulic control valve fluidly coupled to one or more tanks containing hydraulic fluid and fluidly coupled to the fluid cylinder; and a feedback transducer coupled to the fluid actuated cylinder and configured to indicate a position of the first gate pin engaging element.

Element 10: wherein the first gate pin engaging element is a first gate pin pusher end, and the discharge actuation apparatus further comprises an opposing, second driver mechanism that comprises a second gate pin engaging element having a second gate pin pusher end, wherein the first and second gate pin pusher ends cooperatively move in opposing directions to move a gate pin of a portable bulk material container from the first position, to the second position, and to the neutral position.

Element 11: wherein the driver mechanism comprises: a biasing member, and a fluid actuated cylinder having an end coupled to a first side of the base frame structure and a driver arm extendable from the fluid actuated cylinder and across a portion of the width from the first position, to the second position, and to the neutral.

Element 12: wherein the driver mechanism further comprises a support member movably coupled to the base frame structure to move along the width of the base frame structure, and wherein the gate pin engaging element comprises a receiver plate coupled to the support member and having the gate pin receiver slot located thereon, the driver arm being coupled to the support member.

Element 13: wherein the biasing member is located between the base frame structure and the support member and has a first end coupled to one of the base frame structure or the support member and a second, opposing end engageable against the other of the base frame or support member, respectively, to exert a biasing force to move the receiver plate to the neutral position.

Element 14: wherein the gate pin receiver slot is wider than the keeper slot.

Element 15: wherein the gate gin receiver slot is a quarter of an inch to 4 inches wider than the keep slot Element 16: wherein the driver mechanism is a fluid actuated cylinder and the driver mechanism further comprises: a hydraulic control valve fluidly coupled to one or more tanks containing hydraulic fluid and fluidly coupled to the fluid actuated cylinder; and a limit switch coupled to a hydraulic control valve and configured to transmit a signal to the hydraulic control valve to cause the fluid actuated cylinder to move the gate pin engaging element to the neutral position.

Element 17: wherein the driver mechanism is a fluid actuated cylinder and the driver mechanism further comprising: a hydraulic control valve fluidly coupled to one or more tanks containing hydraulic fluid and fluidly coupled to the fluid actuated cylinder; and a feedback transducer coupled to the fluid actuated cylinder and configured to indicate a position of the gate pin engaging element.

Element 18: wherein the driver mechanism is a first driver mechanism and the gate pin engaging element is a first gate pin engaging element having a first gate pin pusher end, and the discharge actuation apparatus further comprises an opposing, second driver mechanism that comprises a second gate pin engaging element having a second gate pin pusher end, wherein the first and second gate pin pusher ends cooperatively move in opposing directions to move a gate pin of a portable bulk material container from the first position, to the second position, and to the neutral position.

What is claimed is:

1. A discharge actuation apparatus for opening a gate on a portable bulk material container, comprising:
    a first base frame structure configured to receive a first portable bulk material container thereon;
    a first driver mechanism coupled to the first base frame structure;
    a first gate pin engaging element having a first gate pin receiver slot and coupled to the first driver mechanism, the first gate pin engaging element being movable along a width of the first base frame structure by the first driver mechanism, the first gate pin engagement slot being engageable with a gate pin of the first portable bulk material container when positioned on the first base frame structure, the first driver mechanism configured to move the first gate pin engaging element from at least a first position, to a second position, and to a neutral position located between the first and second positions; and
    a first biasing member located between the first base frame structure and the first gate pin engaging element, the first biasing member configured to provide a biasing force there between during operation.

2. The discharge actuation apparatus of claim 1, wherein the first driver mechanism comprises
    a first fluid actuated cylinder having an end coupled to a first side of the first base frame structure and a first driver arm extendable from the first fluid actuated cylinder and across a portion of the width from the first position to the second position and to the neutral position.

3. The discharge actuation apparatus of claim 2, wherein the first driver mechanism further comprises a first support member movably coupled to the first base frame structure to move along the width of the first base frame structure, and wherein the first gate pin engaging element comprises a first receiver plate coupled to the first support member and having the first gate pin receiver slot located thereon.

4. The discharge actuation apparatus of claim 3, wherein the first biasing member is located between the first base frame structure and the first support member and has a first end coupled to one of the first base frame structure or the first support member and a second, opposing end engageable against the other of the first base frame or first support member, respectively, to exert a biasing force to move the first receiver plate to the neutral position.

5. The discharge actuation apparatus of claim 1, further comprising a second actuation apparatus, and wherein the second actuation apparatus comprises:
    a second base frame structure configured to receive a second portable bulk material container thereon;
    a second driver mechanism coupled to the second base frame structure; and
    a second gate pin engaging element having a second gate pin receiver slot and coupled to the second driver mechanism, the second gate pin engaging element being movable along a width of the second base frame structure by the second driver mechanism, the second pin receiver slot being engageable with a gate pin of the second portable bulk material container when positioned on the second base frame structure, the second driver mechanism configured to move the second gate pin engaging element from at least a first position, to a second position, and to a neutral position located between the first and second positions.

6. The discharge actuation apparatus of claim 5, wherein the second driver mechanism comprises:
    a second biasing member, and
    a second fluid actuated cylinder having an end coupled to a first side of the second base frame structure and a second driver arm extendable from the second fluid actuated cylinder and across a portion of the width of the second base frame structure from the first position, to the second position, and to the neutral position.

7. The discharge actuation apparatus of claim 5, wherein the second driver mechanism comprises a second support member movably coupled to the second base frame, and wherein a second biasing member is located between the second base frame structure and the second support member and has a first end coupled to one of the second base frame structure or the second support structure and a second, opposing end engageable against the other of the second base frame structure or second support, respectively, to exert a biasing force to move the second gate pin engaging element to the neutral position.

8. The discharge actuation apparatus of claim 5, wherein the first driver mechanism is a first fluid actuated cylinder and further comprises a hydraulic control valve fluidly coupled to one or more tanks containing hydraulic fluid and fluidly coupled to the first and second fluid actuated cylinders, the hydraulic control valve controlling a flow of hydraulic fluid from the one or more tanks to the first and second fluid actuated cylinders.

9. The discharge actuation apparatus of claim 1, wherein the first driver mechanism is a fluid actuated cylinder and the first driver mechanism further comprises:
   a hydraulic control valve fluidly coupled to one or more tanks containing hydraulic fluid and fluidly coupled to the fluid actuated cylinder; and
   a limit switch coupled to a hydraulic control valve and configured to transmit a signal to the hydraulic control valve to cause the fluid actuated cylinder to move the first gate pin engaging element to the neutral position.

10. The discharge actuation apparatus of claim 1, wherein the first driver mechanism is a fluid actuated cylinder and the first driver mechanism further comprises:
    a hydraulic control valve fluidly coupled to one or more tanks containing hydraulic fluid and fluidly coupled to the fluid cylinder; and
    a feedback transducer coupled to the fluid actuated cylinder and configured to indicate a position of the first gate pin engaging element.

11. The discharge actuation apparatus of claim 1, wherein the first gate pin engaging element is a first gate pin pusher end, and the discharge actuation apparatus further comprises an opposing, second driver mechanism that comprises a second gate pin engaging element having a second gate pin pusher end, wherein the first and second gate pin pusher ends cooperatively move in opposing directions to move a gate pin of a portable bulk material container from the first position, to the second position, and to the neutral position.

12. A bulk material delivery system, comprising:
    a portable bulk container comprising:
        a material storage area;
        a slideable gate located at the bottom of the material storage area;
        a gate pin coupled to a sliding assembly that is operatively connected to the slideable gate to move the slideable gate to at least an open position or closed position;
        a keeper moveably coupled to the sliding assembly from a first keeper position to a second keeper position and having a keeper slot formed therein that captures the gate pin within the keeper slot and limits movement of the gate pin when the keeper is in the second keeper position; and
    a discharge actuation apparatus for moving the slideable gate on the portable bulk material container, comprising:
        a base frame structure configured to receive the portable bulk material container thereon;
        a driver mechanism coupled to the base frame structure; and
        a gate pin engaging element having a gate pin receiver slot and coupled to the driver mechanism, the gate pin engaging element being movable along a width of the base frame structure by the driver mechanism, the gate pin receiver slot being engageable with the gate pin of a portable bulk material container when positioned on the base frame structure, the driver mechanism configured to move the gate pin engaging element from at least a first position, to a second position, and to a neutral position located between the first and second positions.

13. The bulk material delivery system of claim 12, wherein the driver mechanism comprises:
    a biasing member, and
    a fluid actuated cylinder having an end coupled to a first side of the base frame structure and a driver arm extendable from the fluid actuated cylinder and across a portion of the width from the first position, to the second position, and to the neutral.

14. The bulk material delivery system of claim 13, wherein the driver mechanism further comprises a support member movably coupled to the base frame structure to move along the width of the base frame structure, and wherein the gate pin engaging element comprises a receiver plate coupled to the support member and having the gate pin receiver slot located thereon.

15. The bulk material delivery system of claim 14, wherein the biasing member is located between the base frame structure and the support member and has a first end coupled to one of the base frame structure or the support member and a second, opposing end engageable against the other of the base frame or support member, respectively, to exert a biasing force to move the receiver plate to the neutral position.

16. The bulk material delivery system of claim 12, wherein the gate pin receiver slot is wider than the keeper slot.

17. The bulk material delivery system of claim 16, wherein the gate pin receiver slot is a 0.25 inches to 4 inches wider than the keeper slot.

18. The bulk material delivery system of claim 12, wherein the driver mechanism is a fluid actuated cylinder and the driver mechanism further comprises:
    a hydraulic control valve fluidly coupled to one or more tanks containing hydraulic fluid and fluidly coupled to the fluid actuated cylinder; and
    a limit switch coupled to the hydraulic control valve and configured to transmit a signal to the hydraulic control valve to cause the fluid actuated cylinder to move the gate pin engaging element to the neutral position.

19. The bulk material delivery system of claim 12, wherein the driver mechanism is a fluid actuated cylinder and the driver mechanism further comprising:
    a hydraulic control valve fluidly coupled to one or more tanks containing hydraulic fluid and fluidly coupled to the fluid actuated cylinder; and
    a feedback transducer coupled to the fluid actuated cylinder and configured to indicate a position of the gate pin engaging element.

20. The bulk material delivery system of claim 12, wherein the driver mechanism is a first driver mechanism and the gate pin engaging element is a first gate pin engaging element having a first gate pin pusher end, and the discharge actuation apparatus further comprises an opposing, second driver mechanism that comprises a second gate pin engaging element having a second gate pin pusher end, wherein the first and second gate pin pusher ends cooperatively move in opposing directions to move a gate pin of a portable bulk material container from the first position, to the second position, and to the neutral position.

* * * * *